United States Patent
Ravi et al.

(10) Patent No.: US 7,134,100 B2
(45) Date of Patent: Nov. 7, 2006

(54) METHOD AND APPARATUS FOR EFFICIENT REGISTER-TRANSFER LEVEL (RTL) POWER ESTIMATION

(75) Inventors: Srivaths Ravi, Princeton, NJ (US); Anand Raghunathan, Plainsboro, NJ (US); Srimat T. Chakradhar, Princeton, NJ (US)

(73) Assignee: NEC USA, Inc., Princeton, NJ (US)

( * ) Notice: Subject to any disclaimer, the term of this patent is extended or adjusted under 35 U.S.C. 154(b) by 207 days.

(21) Appl. No.: 10/206,672

(22) Filed: Jul. 29, 2002

(65) Prior Publication Data

US 2004/0019859 A1   Jan. 29, 2004

(51) Int. Cl.
*G06F 17/50* (2006.01)
(52) U.S. Cl. .................... 716/2; 716/1; 716/18; 703/14
(58) Field of Classification Search .................... 716/2, 716/6, 17, 18, 1, 4; 707/102; 703/14
See application file for complete search history.

(56) References Cited

U.S. PATENT DOCUMENTS

| | | | |
|---|---|---|---|
| 5,742,814 A * | 4/1998 | Balasa et al. ............... | 707/102 |
| 6,324,678 B1 * | 11/2001 | Dangelo et al. .............. | 716/18 |
| 6,735,744 B1 * | 5/2004 | Raghunathan et al. ......... | 716/4 |
| 2003/0208723 A1 * | 11/2003 | Killian et al. .................. | 716/1 |

* cited by examiner

*Primary Examiner*—Thuan Do
(74) *Attorney, Agent, or Firm*—Sughrue Mion, PLLC

(57) ABSTRACT

Techniques for accelerating power estimation for a circuit comprising generating an RTL description of the circuit. A power model enhanced RTL description of the circuit is generated. A simulator is selected. The power model enhanced RTL description is modified to make it more friendly to the simulator. The simulator is run to estimate the power consumed by the circuit. Techniques using delayed computation and partitioned sampling are also provided. Power estimation systems using the above techniques area also provided.

27 Claims, 17 Drawing Sheets

Power waveforms / profiles (b)

```
architecture VHDLgen of test1 is
..........
signal fu_power: real := 0.0;
signal power4: real := 0.0;
..........
begin
    -- An example RTL component (1-bit adder)
    addwc_1bit(testlin1(0), testlin2(0),testlout(0));
    -- Corresponding power model
VHDLgen_PW4: addwc_1bit_power port map
    (testlin1(0),testlin2(0),
                POW_STROBE,  power4);
..........
--Summing up power values
process pow_total
    ..........
    fu_power <= ( .......... + power4 + .............. );
    ..........
end VHDLgen;
```

Fig. 2

```
entity addwc_1bit_power IS
    port (in1: IN std_logic;in2:IN std_logic; POW_STROBE: in
          std_logic; power: out real);
end addwc_1bit_power;
architecture VHDLgen OF addwc_1bit_power IS
type bit_queue is array(1 downto 0) of std_logic_vector(0 to 0);
begin
    process(POW_STROBE)
        variable q_in1: bit_queue;
        variable q_in2: bit_queue;
        variable in11 : std_logic_vector(0 to 0);
        variable in21 : std_logic_vector(0 to 0);
    begin
        if POW_STROBE = '1' AND (POW_STROBE'event) then
            q_in1(1):= q_in1(0); in11(0) := in1;
            q_in2(1):=  q_in2(0); in21(0) := in2;
            q_in1(0)  := in11; q_in2(0)    := in21;
            power <=
                trans_count(q_in1(0),q_in1(1),0)*0.0001100011
              + trans_count(q_in2(0),q_in2(1),0)*0.0001085876;
        end if;
    end process;
end VHDLgen;
```

Fig. 3

```
function trans_count(prev: std_logic_vector;
    cur : std_logic_vector; i : integer) return real is
variable bw : integer;
begin
    bw := (cur'high - cur'low) + 1;
    if ( i >= bw ) then
        return 0.0;
    else
        if ((cur(i) XOR prev(i)) = '1') then
            return 1.0;
        else
            return 0.0;
        end if;
    end if;
end;
```

Fig. 4

```
-- Entity declaration here
architecture VHDLgen OF addwc_1bit_power IS
type bit_queue is array(1 downto 0) of std_logic_vector(0 to 0);
begin
-- Rest of the code as before for declarations & queue updates
-- Inlined power consumption evaluation as an integer
if ((q_in1(0)(0) XOR q_in1(1)(0)) = '1') then
        if ((q_in2(0)(0) XOR q_in2(1)(0)) = '1') then
                power <= 218;
        else
                power <= 110;
        end if;
else
        if ((q_in2(0)(0) XOR q_in2(1)(0)) = '1') then
                power <= 108;
        else
                power <= 0;
        end if;
end if;
    end process;
end VHDLgen;
```

Fig. 5

```
architecture VHDLgen of test1 is
    ............
    signal fu_power: real := 0.0;
    signal power4: integer := 0;
    ............
begin
    -- An example RTL component (1-bit adder)
    addwc_1bit(test1in1(0), test1in2(0),test1out(0));
    -- Corresponding power model
    VHDLgen_PW4: addwc_1bit_power port map (test1in1(0), test1in2(0),
                                POW_STROBE,  power4);
    ............
    --Summing up power values
    process pow_total
        constant integer_scaling_factor := 1e-6;
    ............
        fu_power <= ( ............ + real(power4) + ............ ) *
                    integer_scaling_factor;
    ............
end VHDLgen;
```

Fig. 6

```
entity addwc_1bit_power IS
  port(in1: IN std_logic;in2:IN std_logic; POW_STROBE: in
    std_logic; STORE_STROBE : in std_logic; power: out integer);
architecture VHDLgen OF addwc_1bit_power IS
  type bit_queue is array (k downto 0) of
    std_logic_vector(0 to 0);
begin
  process(POW_STROBE, STORE_STROBE)
    variable q_in1: bit_queue;variable q_in2: bit_queue;
    variable in11 : std_logic_vector(0 to 0);
    variable in21 : std_logic_vector(0 to 0);
    variable queue_index: integer := 1;
begin
  if STORE_STROBE = '1' AND (STORE_STROBE'event) then
    in11(0) := in1; q_in1(q_index)   := in11;
    in21(0) := in2; q_in2(q_index)   := in21;
    q_index := q_index + 1; end if;
  if POW_STROBE = '1' AND (POW_STROBE'event) then
    power <= trans_count(q_in1,q_index,0) * 0.0001100011
      + trans_count(q_in2,q_index,0) * 0.0001085876;
    q_index := 1; q_in1(0) := q_in1(k);
    q_in2(0) := q_in2(k);
  end if; end process;
end VHDLgen;
```

Fig. 7

```
function trans_count(val_queue: bit_queue;
    queue_index : integer; bitpos : integer) RETURN integer IS
    variable bw : integer; VARIABLE i : integer;
    variable retval : integer;
begin
    bw := (val_queue(0)'high - val_queue(0)'low) + 1;
    if ( bitpos >= bw ) then
        return 0;
    else
        for i in 1 to k loop
            if ((val_queue(i)(bitpos) xor
                 val_queue(i-1)(bitpos)) = '1') then
                retval := retval + 1;
            end if;
        end loop;
        return retval;
    end if;
end;
```

|  | $C_1$ | $C_2$ | $C_3$ |
|---|---|---|---|
| Aggregate mean power | 2.39 | 25.71 | 6.0 |
| Aggregate standard deviation | 8.40 | 67.77 | 12.19 |
| Number of RTL components | 120 | 256 | 85 |

Fig. 13

METHOD AND APPARATUS FOR EFFICIENT REGISTER-TRANSFER LEVEL (RTL) POWER ESTIMATION

I. DESCRIPTION

I.A. Field

This disclosure teaches power estimation methods and apparatus in relation to commercial design flow for power estimation of RTL circuits. Specifically, enhancements that improve the efficiency and scalability of power estimation tools for large RTL circuit designs are disclosed.

I.B. Background

1. REFERENCES

The following papers provide useful background information, for which they are incorporated herein by reference in their entirety, and are selectively referred to in the remainder of this disclosure by their accompanying reference numbers in triangular brackets (i.e., <3> for the third numbered paper by E. Macii et al.):

<1> P. Landman, "High-level power estimation," in Proc. Int. Symp. Low Power Electronics & Design, pp. 29–35, August 1996.

<2> A. Raghunathan, N. K. Jha, and S. Dey, High-level Power Analysis and Optimization. Kluwer Academic Publishers, Norwell, Mass., 1998.

<3> E. Macii, M. Pedram, and F. Somenzi, "High-level power modeling, estimation, and optimization," in Proc. Design Automation Conf., pp. 504–511, June 1997.

<4> K. D. Muller-Glaser, K. Kirsch, and K. Neusinger, "Estimating essential design characteristics to support project planning for ASIC design management," in Proc. Int. Conf. Computer-Aided Design, pp. 148–151, November 1991.

<5> D. Liu and C. Svensson, "Power consumption estimation in CMOS VLSI chips," IEEE J. Solid-State Circuits, vol. 29, pp. 663–670, June 1994.

<6> D. Marculescu, R. Marculescu, and M. Pedram, "Information theoretic measures for energy consumption at the register-transfer level," in Proc. Int. Symp. Low Power Design, pp. 81–86, April 1995.

<7> F. N. Najm, "Towards a high-level power estimation capability," in Proc. Int. Symp. Low Power Design, pp. 87–92, April 1995.

<8> M. Nemani and F. Najm, "High-level area and power estimation for VLSI circuits," IEEE Trans. Computer-Aided Design, vol. 18, pp. 697–713, June 1999.

<9> C. H. Chen and C. Y. Tsui, "Towards the capability of providing power-area-delay tradeoff at the register transfer level," in Proc. Int. Symp. Low Power Electronics & Design, pp. 24–29, August 1998.

<10> K. M. Buyuksahin and F. N. Najm, "High-level power estimation with interconnect effects," in Proc. Int. Symp. Low Power Electronics & Design, pp. 197–202, August 2001.

<11> V. Krishna and N. Ranganathan, "A methodology for high level power estimation and exploration," in Proc. Great Lakes Symp. VLSI, pp. 420–425, February 1998.

<12> D. D. Gajski, N. D. Dutt, A. C.-H. Wu, and S. Y.-L. Lin, High-level Synthesis: Introduction to Chip and System Design. Kluwer Academic Publishers, Norwell, Mass., 1992.

<13> S. R. Powell and P. M. Chau, "Estimating power dissipation of VLSI signal processing chips: The PFA technique," in Proc. VLSI Signal Processing IV, pp. 250–259, September 1990.

<14> J. W. Zhu, P. Agrawal, and D. D. Gajski, "RT level power analysis," in Proc. Asia South Pacific Design Automation Conf., pp. 517–522, January 2000, assume constant power per-activation for each type of RTL component, determine activation frequency through RTL profiling.

<15> P. Landman and J. M. Rabaey, "Architectural power analysis: The dual bit type method," IEEE Trans. VLSI Systems, vol. 3, pp.173–187, June 1995.

<16> P. E. Landman and J. M. Rabaey, "Black-box capacitance models for architectural power analysis," in Proc. Int. Wkshp. Low Power Design, pp. 165–170, April 1994.

<17> P. Landman and J. M. Rabaey, "Activity-sensitive architectural power analysis for the control path," in Proc. Int. Symp. Low Power Design, pp. 93–98, April 1995.

<18> T. Sato, Y. Ootaguro, M. Nagamatsu, and H. Tago, "Evaluation of architecture-level power estimation for CMOS RISC processors," in Proc. Symp. Low Power Electronics, pp. 44–45, October 1995.

<19> H. Mehta, R. M. Owens, and M. J. Irwin, "Energy characterization based on clustering," in Proc. Design Automation Conf., pp. 702–707, June 1996.

<20> L. Benini, A. Bogliolo, M. Favalli, and G. DeMicheli, "Regression models for behavioral power estimation," in Proc. Int. Wkshp. Power & Timing Modeling, Optimization, and Simulation (PATMOS), 1996.

<21> A. Raghunathan, S. Dey, and N. K. Jha, "Register-transfer level estimation techniques for switching activity and power consumption," in Proc. Int. Conf. Computer-Aided Design, pp. 158–165, November 1996.

<22> C. T. Hsieh, Q. Wu, C. S. Ding, and M. Pedram, "Statistical sampling and regression analysis for RT-level power evaluation," in Proc. Int. Conf. Computer-Aided Design, pp. 583–588, November 1996.

<23> S. Gupta and F. N. Najm, "Power modeling for high level power estimation," IEEE Trans. VLSI Systems, vol.8, pp. 18–29, February 2000.

<24> S. Gupta and F. N. Najm, "Analytical models for RTL power estimation of combinational and sequential circuits," IEEE Trans. Computer-Aided Design, vol. 19, pp. 808–814, July 2000.

<25> Z. Chen and K. Roy, "A power macromodeling technique based on power sensitivity," in Proc. Design Automation Conf., pp. 678–683, June 1998.

<26> Q. Wu and Q. Qiu and M. Pedram and C.-S. Ding, "Cycle-accurate macro-models for RT-level power analysis," IEEE Trans. VLSI Systems, vol.6, pp. 520–528, December 1998.

<27> M. Barocci, L. Benini, A. Bogliolo, B. Ricco, and G. DeMicheli, "Lookup table power macro-models for behavioral library components," in Proc. IEEE Alessandro Volta Mem. Wkshp. on Low-Power Design, pp. 173–181, March 1999.

<28> R. Corgnati and E. Macii and M. Poncino, "Clustered table-based macromodels for RTL power estimation," in Proc. Great Lakes Symp. VLSI, pp. 354–357, March 1999.

<29> A. Bogliolo, L. Benini, and G. De Micheli, "Characterization-free behavioral power modeling," in Proc. Design Automation & Test Europe (DATE) Conf., pp. 767–773, March 1998.

<30> R. Ferreira, A. M. Trullemans, J. Costa, and J. Monteiro, "Probabilistic bottom-up RTL power estimation," in Proc. Int. Symp. Quality of Electronic Design (ISQED), pp. 439–446, March 2000.

<31> A. Bogliolo, L. Benini, and G. De Micheli, "Adaptive least mean square behavioral power modeling," in Proc. European Design & Test Conf., pp. 404–410, March 1997.

<32> A. Bogliolo and L. Benini, "Robust RTL power macromodels," IEEE Trans. VLSI Systems, vol. 6, pp. 578–581, December 1998.

<33> D. Bruni, G. Olivieri, A. Bogliolo, and L. Benini, "Delay-sensitive power estimation at the register-transfer level," in Proc. Int. Conf. Electronics, Circuits, and Systems (ICECS), pp. 1031–1034, September 2001.

<34> A. Bogliolo and R. Corgnati and E. Macii and M. Poncino, "Parameterized RTL power models for soft macros," IEEE Trans. VLSI Systems, vol. 9, pp. 880–887, December 2001.

<35> R. P. Llopis and F. Goossens, "The Petrol approach to high-level power estimation," in Proc. Int. Symp. Low Power Electronics & Design, pp. 130–132, August 1998.

<36> D. I. Cheng, K.-T. Cheng, D. C. Wang, and M. Marek-Sadowska, "A new hybrid methodology for power estimation," in Proc. Design Automation Conf., pp. 439–444, June 1996.

<37> PowerTheater, Sequence Design Inc. (http://www.sequencedesign.com).

<38> PowerChecker, BullDAST s.r. 1. (http://www.bulldast.com).

<39> K. Wakabayashi, "C-Based High-Level Synthesis System, "CYBER"-Design Experience-," NEC Research and Development, vol. 41, pp. 264–268, July 2000.

<40> W. N. Venables and B. D. Ripley, Modern Applied Statistics with S-PLUS. Springer-Verlag, 1998.

<41> Nachiketh Potlapally et. al., "Accurate macro-modeling techniques for complex RTL components," in Proc. Int. Conf. VLSI Design, January 2001.

<42> A. K. Jain and R. C. Dubes, Algorithms for Clustering Data. Prentice Hall, Englewood Cliffs, N.J., 1988.

<43> A. K. Jain, M. N. Murty, and P. J. Flynn, "Data Clustering: A Review," ACM Computing Surveys, vol. 31, pp. 264–323, September 1999.

<44> M. N. Murty and G. Krishna, "A Computationally Efficient Technique for Data Clustering," Pattern Recognition, vol. 12, pp. 153–158, 1980.

<45> R. Burch, F. N. Najm, P. Yang, and T. Trick, "A Monte Carlo approach for power estimation," IEEE Trans. VLSI Systems, vol. 1, pp. 63–71, March 1993.

<46> B. A. Murtagh and M. A. Saunders, "Large-scale Linearly Constrained Optimization," Mathematical Programming, vol. 14, no. 1, pp. 41–72, 1978.

<47> AMPL: A Modeling Language For Mathematical Progamming (http://www.ampl.com).

<48> Excel Solver (http://www.solver.com).

<49> CB-C9 Family VX/VM Type 0.35 um CMOS CBIC Users Manual. NEC Electronics, Inc., September 1998.

<50> ModelSim 5.3 (http://www.model.com).

<51> OpenCAD V 5 Users Manual. NEC Electronics, Inc., September 1997.

<52> Design Compiler, Synopsys Inc. (http://www.synopsys.com).

2. INTRODUCTION

The move towards true register transfer level (RTL) sign-off capability in ASIC design flows, as well as the emergence of system-level design methodologies, are leading to an increased adoption of tools to evaluate a design's characteristics at the RT-level.

In an RTL sign-off flow, RTL estimation tools that estimate a design's performance, power consumption, area, and testability, are relied upon to make very critical decisions (e.g., to determine the cost model and device performance guarantee provided by ASIC vendors to their customers, or to determine the packaging used). The resulting opportunities to deploy RTL estimation technologies (that have been extensively researched but limited in their commercial use) are accompanied by many significant challenges. The new generation of RTL estimation tools needs to meet very high demands on efficiency (to enable full-chip application), accuracy (to use them for sign-off), and ease of use in the context of existing design flows. The increase in circuit sizes, and the complex effects introduced by deep submicron technologies (impact of interconnect on timing and power, interdependence of timing and power, etc.) make efficient yet accurate RTL estimation a daunting task.

The present disclosure is focused on the problem of efficient RTL power estimation for large designs. RTL power estimation is a well studied topic, and several basic approaches to RTL power estimation have been proposed <1,2,3>. The proposed ideas are general, and can be applied to a large class of power estimation techniques I.C. Related Work In this sub-section, conventional RTL power estimation techniques are discussed. RTL power estimation techniques may be classified from the perspective of the functionality they provide, or based on the underlying techniques employed. While efficiency (ability to handle large designs) and accuracy (relative vs. absolute) are clearly critical from the user's perspective, other features such as the structural granularity of the power estimates provided (entire design vs. hierarchical or component-by-component), and the temporal resolution (e.g. aggregate or average power vs. cycle-by-cycle power estimates) may also be important, depending on the exact context of use of the RTL power estimation tool in the design flow.

In terms of the techniques employed, RTL power estimation approaches can be classified into three broad categories, namely analytical techniques, characterization-based macromodeling, and fast synthesis based estimation. It is important to note that different estimation techniques may be best suited to different parts of a design (such as arithmetic macro blocks, control logic, memory, clock network, and I/O).

Analytical power modeling techniques attempt to correlate power consumption to measures of design complexity, using very little information from the functional specification. They are useful early in the design flow, and target relative rather than absolute accuracy.

For example, the Chip Estimation System <4> computes the power consumed in a logic block based on its estimated gate count, the average switching energy and load capacitance per gate, the clock frequency, and the average switching activity factor. The user is required to provide estimates for each of these parameters, leaving a lot to his/her judgment. While such techniques are error-prone in general, they may be accurate for some parts of a chip for which the complexity parameters are easy to estimate (e.g., memories and clock networks <5>). A class of analytical techniques, called information-theoretic approaches, estimate average activity and capacitance factors for logic blocks based on the entropy of their input and output signals <6, 7, 8>. Enhancements and variants to these approaches include consideration of the effect of area-delay-power tradeoff performed during logic synthesis <9>, prediction of power consumed in interconnect <10>, and the use of decision theory <11>.

Designs at the architecture level or RTL can be thought of as being composed of various macro blocks including arithmetic operators, multiplexers, registers, vector logic operators, etc, in addition to random logic. In characterization-based macro-modeling, the idea is to obtain and characterize a lower-level implementation (that may be already available in the case of "hard" or "firm" macro blocks, or may need to be synthesized in the case of "soft" macro blocks). Typically, a gate-level or transistor-level tool is used to estimate the power consumption of the macro block for various input sequences, called training sequences. Based on this data, a macro-model or "black-box" model is constructed, which describes the power consumption of the block as a function of various parameters, e.g., the signal statistics of the block inputs and outputs. Characterization-based macro-models are best suited for bottom-up and meet-in-the-middle design methodologies <12>, such as high-level synthesis based design flows, where hard or firm macro blocks can be instantiated from a component library. The characterization process, which is used to construct the power macro-models, can be thought of as part of the library development process, which is an effort that can be re-used for several designs.

One of the early architecture-level power estimation techniques, the PFA technique <13>, characterized macro blocks with a constant power value, obtained by simulating their implementations with random input sequences. The use of such models for controller-datapath circuits was discussed in <14>. The dependency of power on input signal statistics was first addressed in the dual bit-type (DBT) method <15>. Activity-sensitive power models <15, 16, 17, 18, 19, 20, 21, 22, 23, 24, 25, 26> alleviate the above deficiency by constructing and utilizing a model for power consumption that is a function of the signal statistics at a macro block's boundaries. This function may be represented in several ways, including closed-form equations, lookup tables, etc.

Given a design that contains instantiations of macro blocks, a typical approach is to use RTL simulation to determine the signal statistics at the various macro block boundaries, and feed the signal statistics for each macro block instance to the corresponding power model to compute the power consumed in that instance.

The accuracy of characterization-based macro-models stems from the fact that a lower-level implementation is used to construct the macro-models. Hence, the effects of the synthesis process, cell library, and target technology, are captured. However, there are several challenges that need to be addressed. The training sequences used to construct the macro-model cannot be exhaustive due to efficiency considerations. Since characterization is done up front with possibly little information about the environment in which the components are going to be used, the training sequences may not very well represent real-life input sequences. Hence, a macro-model may be "biased" by the training sequences used during the characterization process. In addition to the above problem, macro-models may introduce inaccuracies since the results of the characterization experiments are fit into a predetermined function template or model, resulting in some errors due to interpolation or extrapolation (fitting error). The computational effort involved in characterization may be significant, especially for large libraries of RTL components.

Several techniques have been recently proposed to address the aforementioned issues. Accuracy and efficiency improvements to lookup table based techniques were proposed in <27, 28>. Symbolic techniques to build power macro-models without the generation of training patterns were developed in <29, 30>. These techniques eliminate the aforementioned "biasing" problem in characterization based macro-modeling. An alternative solution to the same problem is to perform "in-situ" characterization for each embedded component in a design, by performing the macro-model construction process concurrently with simulation of the entire design <31>. By considering the values at selected internal signals of the component as variables in the macro-model (in addition to values at inputs/outputs), robustness and accuracy of macro-models can be improved <32>. Techniques to account for the effect of glitching during macro-modeling based RTL power estimation were investigated in <21, 33>. Since RT-level macro-models are typically constructed from a gate- or transistor-level netlist, they are normally applicable to RTL components that are firm or hard macros. In the case of soft macros that are also parameterizable with respect to bit-width, it is possible to develop base macro-models for specific technologies and bit-widths, which are then scaled to account for the necessary variations <34>. This reduces the re-characterization effort involved in "porting" the macro-models to reflect a new technology or synthesis flow.

Fast synthesis refers to the process of performing a limited synthesis of the RTL description that is much faster than the actual logic synthesis and technology mapping process. The design is mapped to a "meta-library" that typically consists of a small number of primitive cells (much smaller than a complete standard cell library). The resulting netlist is used for power estimation using simulation based or probabilistic techniques. The fast synthesis approach was adapted in <35> by decomposing various functions into a set of power primitives, each of which was monitored for input and output activity during simulation.

Control logic analysis techniques deal with the control or random logic parts of a design. The activity-based control (ABC) model <17> is an example of a controller power estimation technique. In addition to computing the power consumed in the control logic, it is also very important to take into account its impact on the power consumption of the rest of the design. The importance of considering spatial and temporal correlations between control signals was demonstrated in <36>. It is also important to take into account the glitching activity at the control signals since it can have a significant impact on the power consumption in the rest of the design <21>.

Commercial tools for RTL power estimation that incorporate some of the above technologies are beginning to see increased commercial interest and adoption <37, 38>.

I.D. Framework for the Disclosed Teachings

Since the focus of this disclosure is the acceleration techniques described further in relation to the implementations discussed in Section IV, this section is intended only for background purposes.

FIG. 1 provides an overview of an RTL power estimation methodology. FIG. 1(a) describes the characterization flow, which is performed only once per technology to generate a power model library. Characterization consists of the following steps:

A comprehensive library of RTL components is constructed with a synthesizeable RTL description of each component. Most RTL-based design flows already employ such a library (e.g., Synopsys Designware). If not, such a library can be constructed by enumerating all native operators in the synthesizeable subset of the supported HDLs. In order to support mixed RTL/gate-level designs, the RTL library also contains a wide range of logic gates.

Each component is subject to synthesis and layout under several different synthesis constraints or conditions, to reflect the different ways in which it may be implemented in the context of a design. It is important to consider a diverse set of synthesis conditions since the same component (e.g., 16-bit adder) can be implemented in very different ways leading to widely differing power consumption. While in theory the number of implementation variations (resulting from different delay and area constraints, synthesis effort levels, input signal slew rate, external output load, layout aspect ratios, etc.) can be very large, it is sufficient to consider a reasonable subset that provides sufficient diversity and covers the "implementation space". After extensive experimentation, we decided to consider speed, output capacitive load, and input slew rate as the parameters that determine the synthesis condition. For each RTL component, we define a range of allowable values for each parameter, which is discretized to result in a finite set of synthesis conditions. For example, the parameter speed may be discretized to three points—slow (the delay of an area-optimized implementation), fast (the fastest possible implementation), and medium (the average of the delays of the slow and fast implementations). The number of discrete values used for each parameter is empirically determined based on the variance of power consumption between implementations corresponding to its extreme values.

The post-layout netlist (transistor-level or gate-level netlist annotated with extracted parasitics) is subject to power characterization to generate a power macro-model that relates the power consumed to the relevant input statistics. The netlist is simulated under pseudo-random input patterns, and the power consumption for each input vector pair is fed to a statistical regression tool <40> to generate the macro-model. Since the estimation methodology needs to support cycle-by-cycle power estimation, cycle-accurate macro-modeling techniques <20, 26, 41> are adopted.

The set of power macro-models for all library components is translated into simulateable power model libraries in different hardware description languages (e.g., VHDL, Verilog, SystemC, etc.). These simulateable power model libraries enable power estimation to be performed concurrently with RTL simulation of the design, as described below.

Once characterization is performed for the target technology, the power estimation process for each design proceeds as follows. The design is first subject to RT-level design planning, which refers to the process of inferring a structural representation from the RTL HDL, mapping the design into an RTL library, and deriving a floor-plan to obtain accurate estimates of global interconnect. The library that is given to the RTL design planning tool corresponds to the RTL library used in characterization, and contains several implementations for each component, corresponding to the synthesis conditions used during characterization. The RTL design planning step is optional when only relative accuracy is needed, but is necessary in order to obtain sign-off strength accuracy, especially in deep sub-micron technologies. The output of RTL design planning is a macro netlist that consists of an interconnection of blocks from the RTL library, with estimates for inter-block interconnect. The macro netlist, together with the original HDL form the inputs to a power analysis tool, that analyzes the design to infer a set of power models from the power model library, and outputs an enhanced RTL HDL description that contains code generated specifically for power estimation. An important feature of our methodology is the use of simulateable power models that are co-simulated with the design's HDL description. This approach differs significantly from the commonly used approach of generating a value trace file from functional simulation, which is post-processed to perform power estimation. The primary advantage of our approach is that it avoids the problem of trace blowup for large designs and long test-benches. This benefit comes at the cost of slightly increased compile times for simulation, since the size of the enhanced RTL description is larger than the size of the original RTL description. However, this tradeoff is quite acceptable, with significant benefits for larger designs. The approach of using simulateable power models is simulator-agnostic, and can be extended to any hardware description language. From a practical perspective, it also minimized our tool development and maintenance effort, allowing us to focus on improving accuracy and efficiency for large designs.

An RTL description enhanced for power estimation consists of the following components (in addition to the original code that specifies the behavior and/or structure of the design):

A power model, instantiated from the power model library, for each basic (leaf) component in the design. Each power model observes the signals that correspond to the inputs and outputs of the corresponding component, and generates a variable that represents the power consumed in the component. The execution of power models are triggered by a Power_strobe signal. As explained later, this allows control of the computational effort involved in power estimation, as well as the accuracy of the power estimates. Since power consumption is a function of both the current and past input values, the power models contain internal queues that remember the necessary history to enable power estimation. For combinational components, it is sufficient to remember the current and previous values at the component's I/O signals. For sequential components, it may also be necessary to remember the internal state. As described in Section IV, this storage within power models can be exploited to reduce the simulation overhead required for power estimation.

Power aggregation code, which accumulates the power consumption of the RTL components in the design. This summation process is performed in a hierarchical manner, corresponding to the hierarchy of the design itself, resulting in power consumption estimates for any instance in the design hierarchy in addition to the entire design. Further, the power estimate can be broken down into separate portions for functional units, registers, multiplexers, and random logic. This detailed feedback allows designers to easily identify the power bottlenecks, and re-design the circuit to reduce power consumption.

Code to activate the power estimation computation. This code generates the Power_strobe signals that trigger the power models for each component in the design, as well as the signals that activate the power summation code. When cycle-by-cycle accuracy is required, the Power_strobe signal is typically generated from the local clock signal, or by monitoring the input signals to the component for changes. As described in Section IV, judicious control of the signals that activate power estimation code can result in significant speedups in power estimation with minimal loss of accuracy.

An example of an enhanced RTL description (in VHDL) is shown in FIG. 2. The changes made to facilitate power estimation are indicated, including instantiation of power models, power aggregation code, and code that activates the power estimation computations. A sample power model (in VHDL) is also shown in FIG. 3 for the purposes of illustration. The contents of the power model can be divided into bitwidth-inference code, code for management of the internal queues, and code that performs the macro-model computation.

II. SUMMARY

To realize the advantages discussed above, the disclosed teachings provide a method for accelerating power estimation for a circuit comprising generating an RTL description of the circuit. A power model enhanced RTL description of the circuit is generated. A simulator is selected. The power model enhanced RTL description is modified to make it more friendly to the simulator. The simulator is run to estimate the power consumed by the circuit.

Another aspect of the disclosed teachings is a method for accelerating power estimation for a circuit comprising generating an RTL description of the circuit. A power model enhanced RTL description of the circuit is generated. A simulator is selected. Tradeoff issues between computation and memory usage for simulating the power model enhanced RTL description on the selected simulator are studied. The required computation for simulating the power model enhanced RTL circuit description on the simulator are reduced by increasing memory usage. The simulator is run to estimate the power consumed by the circuit.

Yet another aspect of the disclosed teachings is a method for accelerating power estimation for a circuit comprising generating an RTL description of the circuit. A power model enhanced RTL description of the circuit is generated. A simulator is selected. Partitioning is performed wherein the RTL description is partitioned into clusters according to their power consumption profile. A customized sampling for each of said clusters is derived. The RTL description on the simulator based on the samplings.

III. BRIEF DESCRIPTION OF THE DRAWINGS

The above objectives and advantages of the disclosed teachings will become more apparent by describing in detail preferred embodiment thereof with reference to the attached drawings in which:

FIG. 1 provides an overview of the RTL power estimation methodology to establish a context in which the disclosed teachings can be applied.

FIG. 2 shows VHDL snippet from a sample design test1.

FIG. 3 shows VHDL specification of the power model addwc__1bit_power.

FIG. 4 shows VHDL specification of the function trans_count.

FIG. 5 shows an Optimized version of the power model addwc__1bit_power.

FIG. 6 shows modifications in test1 due to power model optimizations.

FIG. 7 shows power model addwc__1bit_power with delayed computation.

FIG. 8 shows a modified VHDL specification of the function trans_count to support delayed computation.

Figure 12:
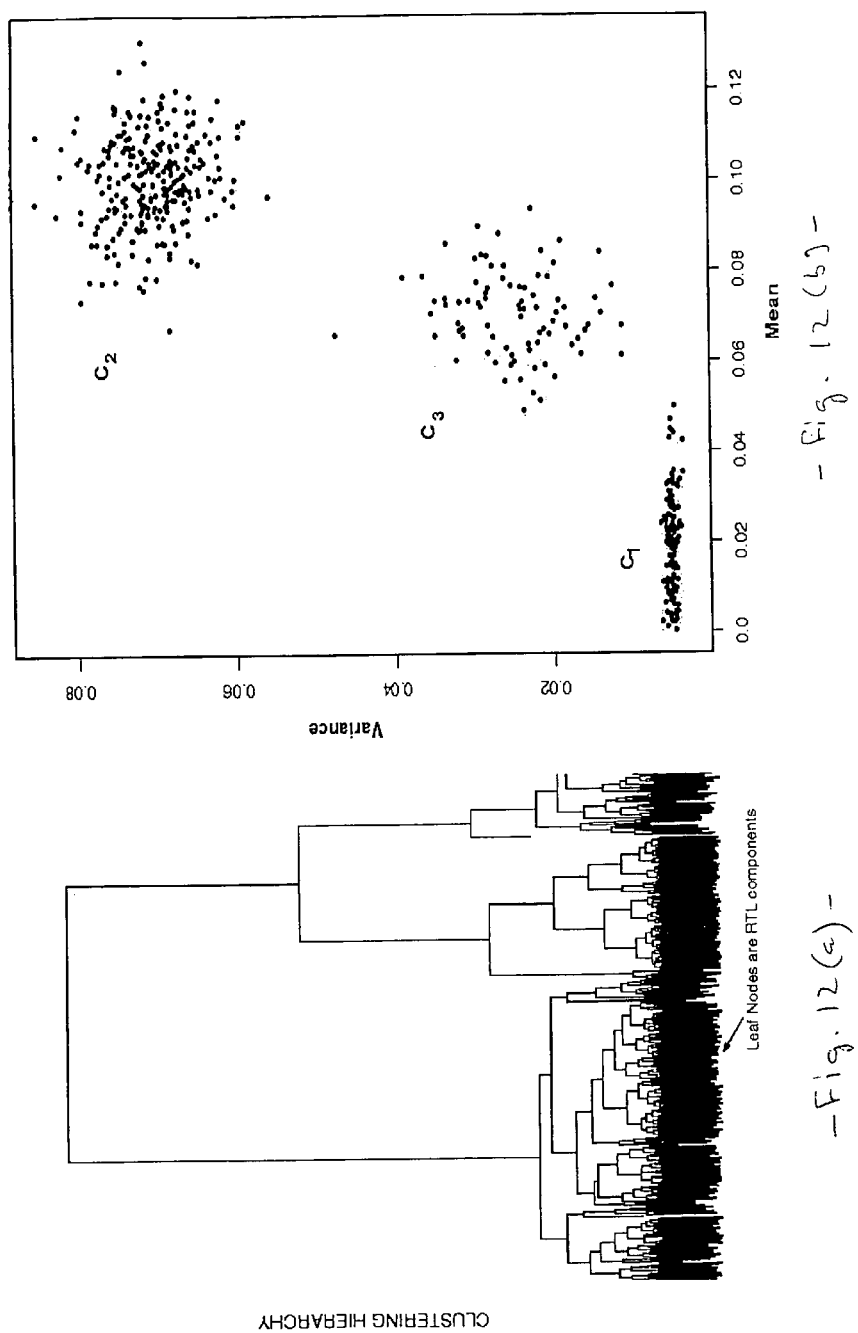

FIGS. 12(*a*)–(*b*) shows the results of clustering a MVSP.

FIG. 13 shows aggregate mean, variance and size statistics for an example clustering.

Figure 14:
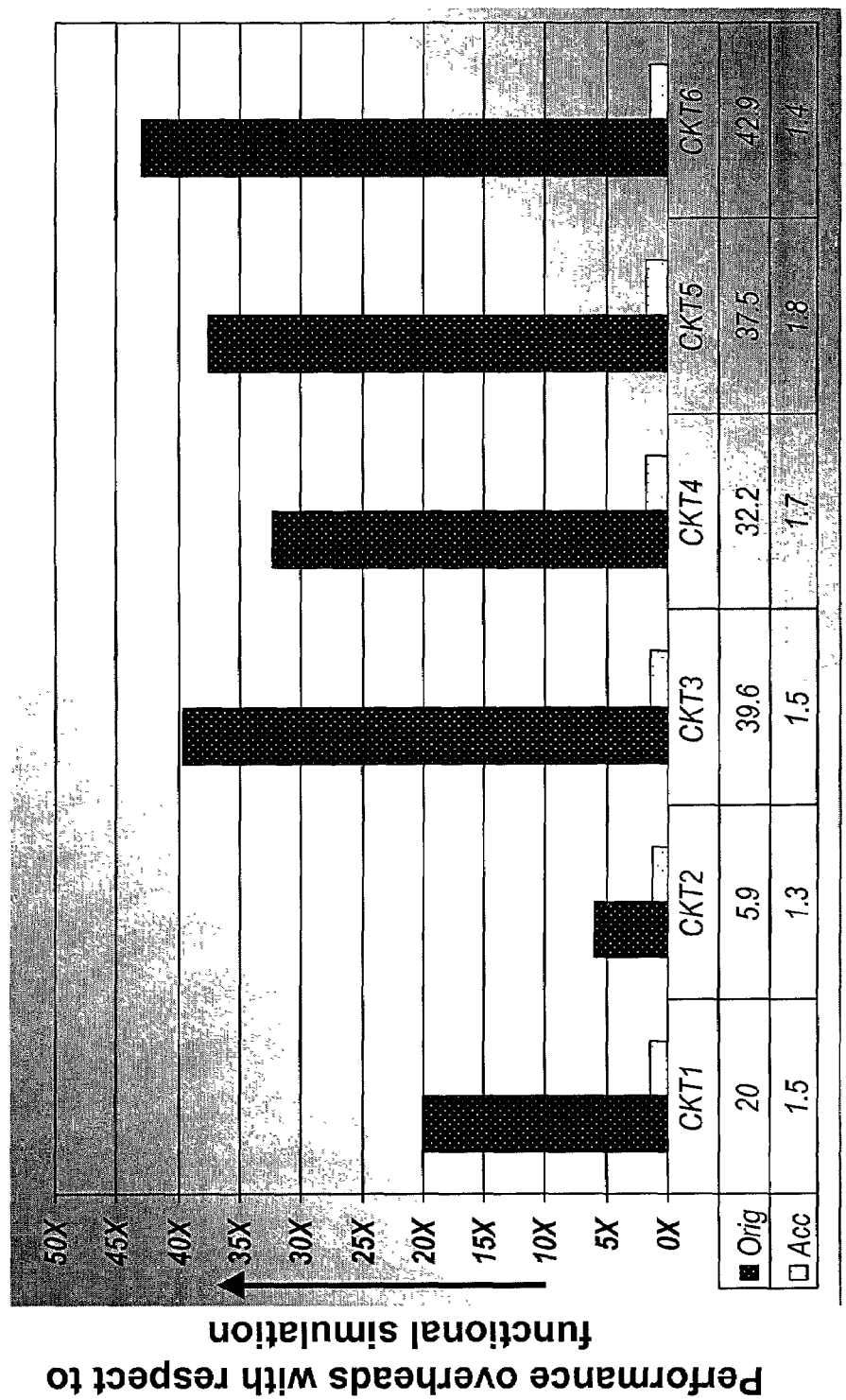

FIG. 14 shows comparisons of performance overheads over functional simulation for power estimation without and with proposed acceleration techniques.

Figure 15:
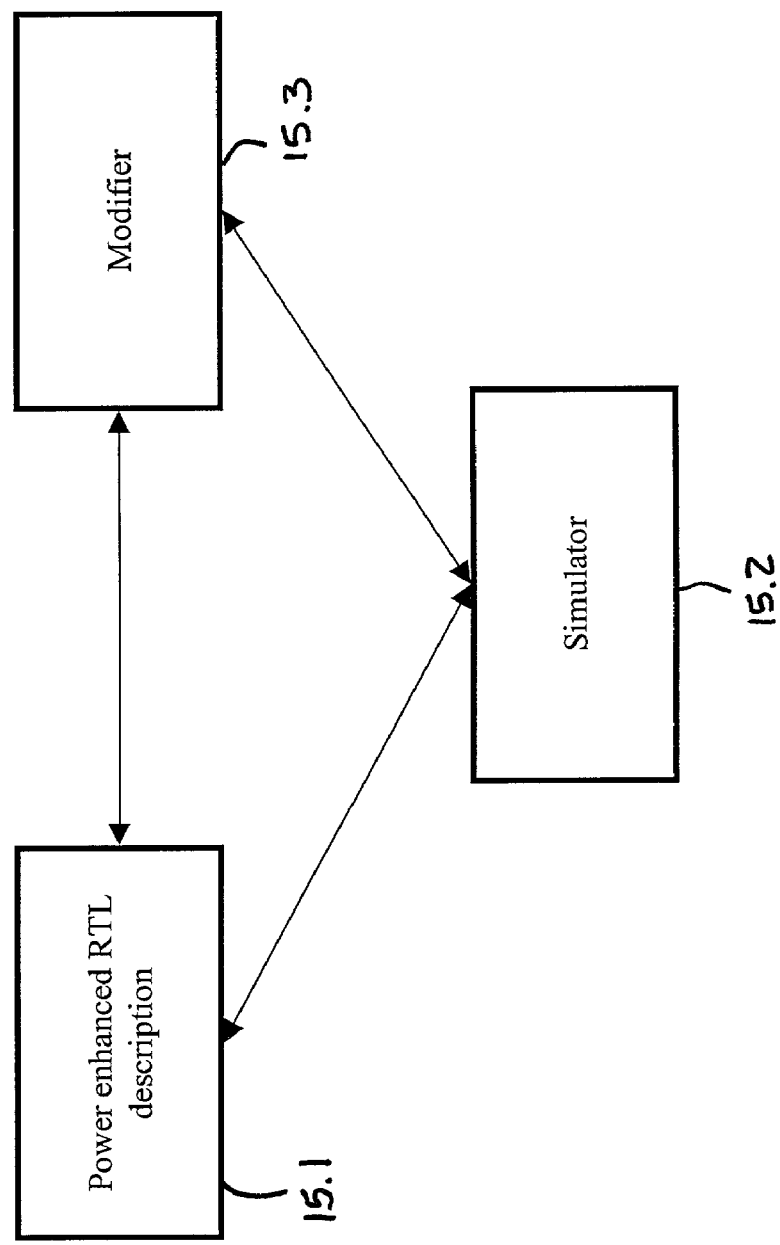

FIG. 15 shows an exemplary power estimation system embodying the HDL modification techniques disclosed.

Figure 16:
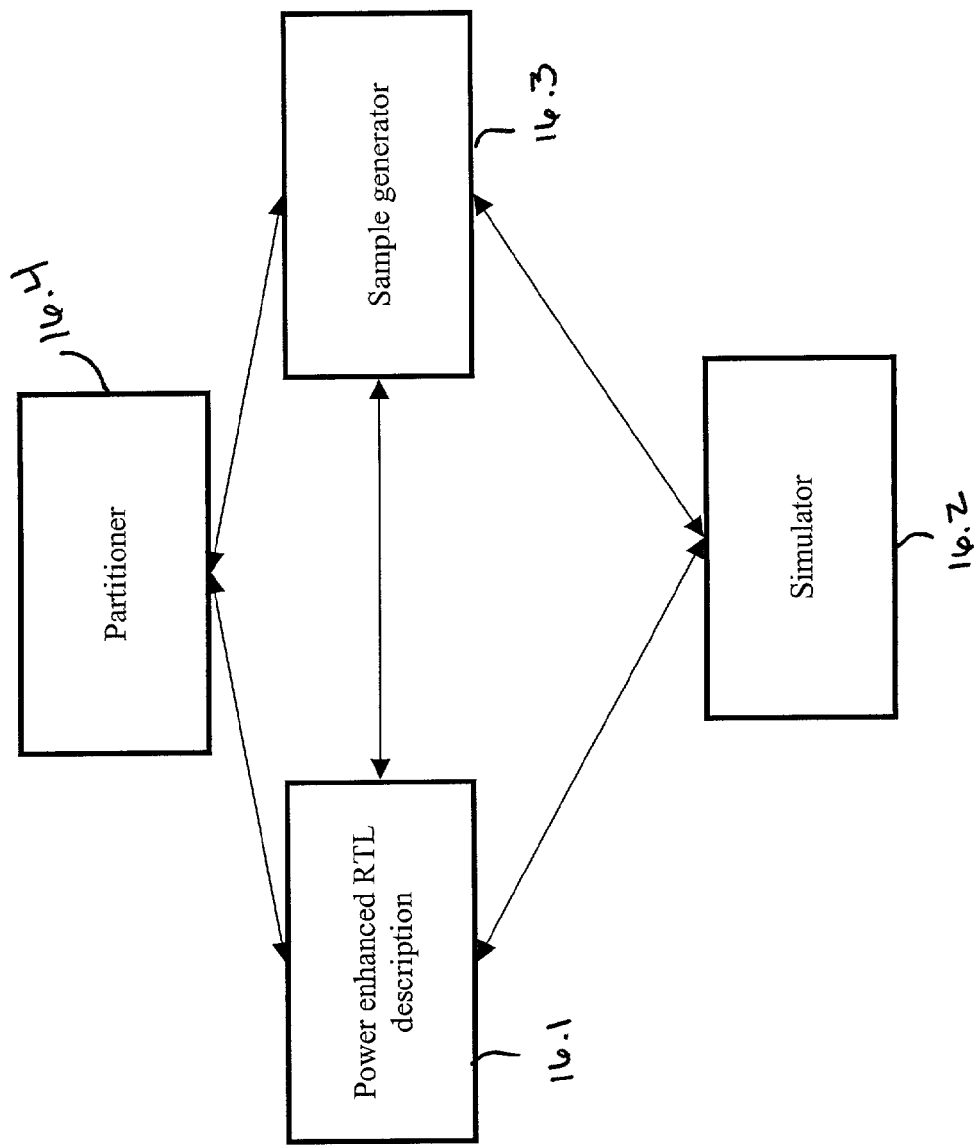

FIG. 16 shows an exemplary power estimation system embodying the computation postponement techniques disclosed.

Figure 17:
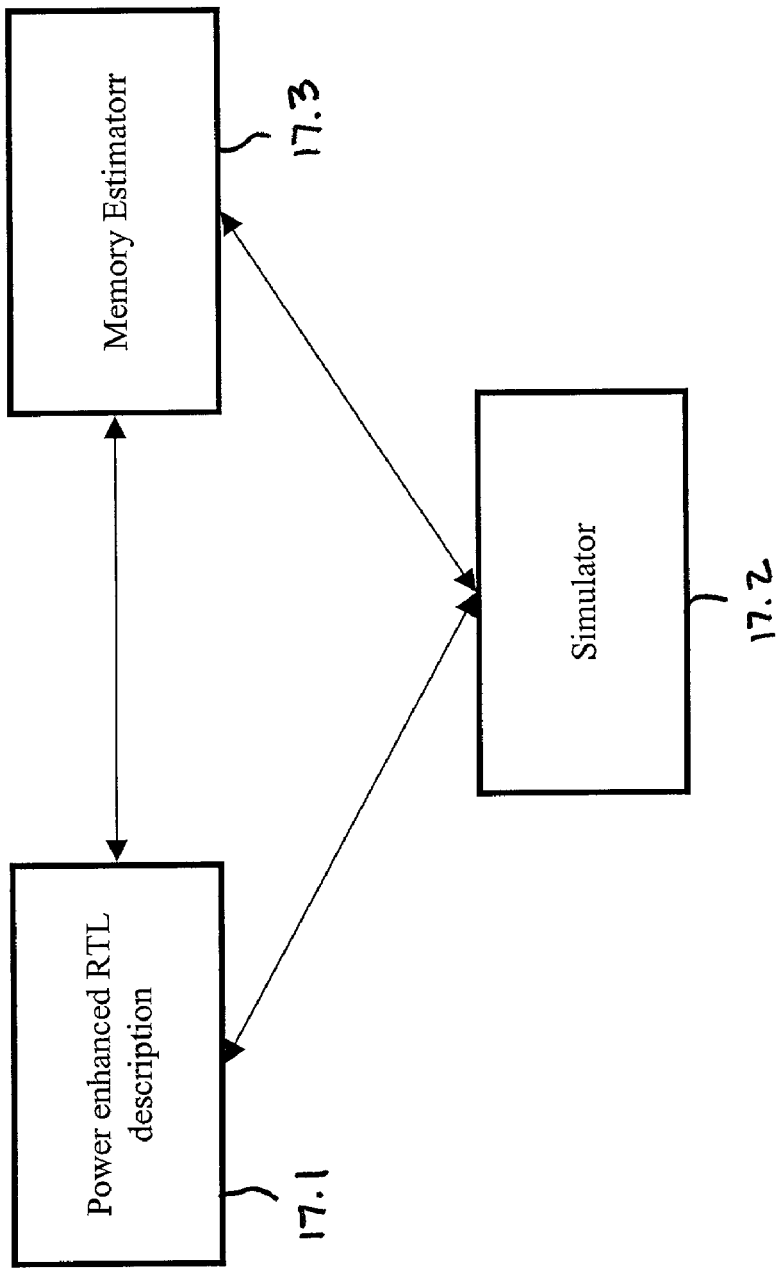

FIG. 17 shows an exemplary power estimation system embodying the partitioned sampling techniques disclosed.

IV. DETAILED DESCRIPTION

IV.A. Synopsis

Some of the objectives in developing the techniques are as follows: (i) to enable power estimation, package selection, power grid design, and IR drop sensitive timing analysis during RT-level sign-off, and (ii) to enable power exploration during the behavioral and architectural design stage. While the above two applications require somewhat different objectives—RTL sign-off requires good absolute accuracy with reasonable performance for large designs, while architectural exploration requires relative accuracy with high performance for repeated evaluation of design alternatives—a judiciously architected tool flow can support both applications without requiring the overhead of developing and maintaining separate tools. It also bears mentioning that the disclosed techniques supports a wide range of RTL design styles including purely structural descriptions, purely functional descriptions, and designs that contain a combination of both. Designs with multiple and gated clocks, and elements such as I/O pads, clock buffers, tristated buses, etc. are supported. In addition, it can handle designs that contain significant amounts of random logic and mixed RTL/gate-level designs. Further, not only average power estimation, but also hierarchical structural power reports (component-by-component), and power vs. time profiles up to cycle-by-cycle granularity.

In this discloure, a suite of techniques that can be used to significantly enhance the efficiency of RTL power estimation are presented. These techniques help in making power estimation it viable for large designs.

The RTL power estimation methodology is applicable both for C- and RTL-based design flows. The methodology is based on (i) automatic characterization of a library of RTL components, (ii) generation of simulateable macro-models for each RTL component, (iii) enhancement of an RTL design's functional description by instantiating the simulateable macro-models for each basic component in the design, and (iv) simulation of the enhanced RTL. This flow (as discussed in the background section) was demonstrated to achieve satisfactory accuracy (5–10% of gate-level average power estimates). However, its efficiency for large designs left much to be desired (up to 60× slower than functional RTL simulation), leading us to develop the techniques described in this document.

The disclosed acceleration techniques were motivated by an extensive profiling of the computational effort involved in RTL power estimation. Several computational bottlenecks cause large simulation overheads. These are overcome in the disclosed techniques by developing several techniques to modify the enhanced RTL description to be more simulator-friendly. Computation vs storage tradeoffs is another factor that reduce the number of computations at the cost of increased memory usage. Also, a novel variation of statistical sampling called partitioned sampling is disclosed, which divides the circuit into several clusters or partitions according to their power consumption characteristics, and derives customized sampling strategies for each partition. Partitioned sampling results in an optimized allocation of the overall computational effort to different parts of the circuit, i.e., more time is spent on the significant contributors to the total power, and on difficult-to-estimate sub-circuits, while less time is spent on sub-circuits whose power consumption is easy-to-predict.

Extensive experimental results in the context of a commercial RTL power estimation flow are presented to demonstrate the efficacy of the proposed techniques. The experiments demonstrate significant improvements (up to 93%) in CPU time for large industrial circuits, with negligible loss of accuracy. Further, it is demonstrated that the proposed techniques result in desirable CPU time vs. accuracy tradeoffs compared to conventional techniques such as statistical sampling or test bench reduction. Finally, it is demonstrated that the proposed acceleration techniques preserve the accuracy of local power estimations (for specific sub-circuits or RTL components), in addition to resulting in accurate estimates of total power consumption.

IV.B. Details of the Acceleration Techniques

In this section, exemplary implementations of a suite of techniques for speeding up RTL power estimation are discussed. Section IV.B.1 gives a brief overview of these techniques, while Section IV.B.2 details each technique with examples.

1. Overview

In simulation-based power estimation, it can be seen that for a given HDL compilation and simulation environment, any acceleration effort must focus on optimizing the simulation-costly elements of the power model enhanced HDL. The optimizations proposed in this work are divided into three general categories outlined below.

a) HDL-aware Optimizations

These optimizations replace HDL code that needlessly burdens the HDL compiler and simulator. A simulation run basically involves finding triggered processes for every event, evaluating them, updating the state and scheduling new events. Thus, the more load the power estimation related processes throw on the simulator, the longer the overall estimation time. Therefore, the underlying strategy for HDL-aware optimizations is to identify and reduce the simulation-costly elements in power computations and replace them with less costly alternatives or eliminate them. During this process, it must be guaranteed that the accuracy of power estimation is maintained.

b) Delayed Computation

Computing the power consumption of a design in a given cycle involves recording the bit-level switching activity at the inputs of every RTL component and invoking the power model in that cycle to calculate the power. For average power estimates, the power model invocation is postponed to a latter cycle by queuing the component input values until that cycle. Thus, the number of power model invocations and, hence, computations can be reduced at the cost of extra memory for queuing the inputs.

c) Partitioned Statistical Sampling

Statistical sampling techniques work on the hypothesis that only a small fraction of the power samples in a simulation run are sufficient to produce a meaningful average power estimate. Thus, efficiency of power estimation can be improved by lowering the frequency with which power samples are obtained for each RTL component. The partitioned sampling techniques presented herein provide a systematic way of identifying RTL components in a design that can be sampled less frequently compared to other RTL components. The experimental results discussed later in this disclosure shows that the use of structured partitioned sampling can bring the power estimations times very close to functional simulation times.

2. Details

Section IV.B.2.(a) describes HDL-aware optimizations, while Sections IV.B.2.(b) and IV.B.2.(c) detail delayed computation and partitioned statistical sampling techniques, respectively.

a) HDL-aware Optimizations

Techniques that modify the HDL semantics in the power model specification to improve simulation performance fall under this category. They include the following.

(1) Operand Datatype Conversion

Power model computations basically involve arithmetic operations with operands that correspond to component I/O switching activities. Arithmetic operations with complex datatypes (such as reals or vectors) on a HDL simulator are significantly more expensive than those with simpler datatypes (integers) followed by reconversion of the computed result back to the complex datatype. Therefore, operand datatype coversion from a complex to a simpler datatype is the most fundamental HDL optimization carried out.

(2) HDL Function Inlining

Whenever functions are used in the power model description, there is an overhead associated with each invocation. Inlining of these functions helps in doing away with these overheads. However, inlining can introduce additional overheads for the simulator. This happens when additional book-keeping is thrust on the simulator due to local variables that get exposed to the HDL code that call the function (e.g., functions have the advantage of hiding local variables from the outer process that invokes it). Therefore, inlining of HDL functions must be judiciously performed on the power model description.

(3) Minimizing Power Model Activations

Power reduction strategies such as clock gating, operand isolation lead to zero switching activities at the inputs of many RTL components for large durations of the simulation. Consequently, the HDL descriptions of the corresponding power model processes can also be modified to be shutdown in a corresponding manner. Thus, by activating the power model processes on an as-needed basis, we can reduce the power model activations to a bare minimum.

(4) Pruning of Power Model Workloads

The workload of a power model process must be reduced to a bare minimum. Any HDL code that involves one-shot computations must be moved to the exterior of the power model process to remove redundant evaluations and book-keeping. Otherwise, the performance of simulation can be severely impacted.

Example 1 illustrates the application of such HDL-aware optimizations to a sample RTL design.

EXAMPLE 1

FIG. 2 gives the HDL description of a design test1, which has an RTL component addwc_1bit and the corresponding power model addwc_1bit_power instantiated in it. Module addwc_1bit has two inputs, test1in1(0) and test1in2(0), and one output, test1out(0). Both test1in1(0) and test1in2(0) form the inputs to the power model addwc_1bit_power. The other input to the power model is its activation signal POW_STROBE and the computed power consumption value power4.

The HDL code generated for the power model is shown in FIG. 3. The HDL description shows a single process which is sensitive to any event on the POW_STROBE signal. The first action of the process is to update the status of the queues that store the previous and current values of the inputs/outputs of addwc_1bit. This is followed by the actual evaluation of power consumption as a function of the bit-level transitions using the function trans_count. FIG. 4 gives an example specification of the function trans_count that simply performs an xor operation on the previous and current bit values.

HDL-aware optimizations such as operand datatype conversion and function inlining can make the function addwc_1bit_power more efficient. FIG. 5 shows the effect of applying these optimizations on the power model code. First, we note that the power value calculated in the HDL-optimized power model is an integer. This means that the equation for power evaluation changes as follows with the coefficients appropriately scaled from their original real values (by a factor of $10^6$ here).

$$\text{power} <= \text{trans\_count(queue\_in1(0), queue\_in1(1), 0)}, *110; \quad (1)$$
$$+\text{trans\_count(queue\_in2(0), queue\_in2(1), 0)}, *108;$$

The trans_count function can be further inlined as shown in FIG. 5. Since this inlining introduces no extra variables to the process used in the power model, it is effective in cutting down the extra costs associated with function call invocation and return.

The effect of these optimizations on the RTL description of test1 is shown in FIG. 6. Changes involve modifying the addwc_1bit_power interface and the way in which the variable fu_power (corresponding to the functional units' power) gets updated. Since power4 is now an integer, it is re-converted to a real and scaled back as shown. Note that changing the datatype of fu_power to an integer is not a viable alternative for a large design because of possible overflow problems.

b) Delayed Computation

In this section, it is shown how RTL power estimation can be accelerated by using computation vs. storage tradeoffs.

The basic power model for an RTL component seen so far updates the previous and current input and/or output values (store operations) before appropriately computing the power consumption (compute operations). Thus, power consumption values are available every cycle. Consider an alternative scenario, where the designer wants the power consumption averaged periodically, say, once in k cycles. The existing power model tailored for cycle-accurate computations would still perform store followed by compute operations k times. On the other hand, the fact that power must be output only in the kth cycle is exploited by queuing the input/output values of the RTL component for k cycles. In the kth cycle, a single compute operation can be performed to determine the power consumption value. Thus, the number of compute operations performed is simply $\frac{1}{k}$ fraction of the total number of cycles.

The following example illustrates the application of delayed computation to an example power model.

EXAMPLE 2

Consider the basic power model addwc_1bit_power seen earlier in FIG. 3 When a falling edge event is seen on POW_STROBE, q_in1 and q_in2 first update the contents of the previous and current values. Then, the power consumption is computed as a function of q_in1 and q_in2.

Delayed computation can be applied to this power model and the modified VHDL specification for addwc_1bit_power is given in FIG. 7. Here, the store and compute operations of the power model are separated into two phases activated by separate strobing signals. The signal STORE_STROBE is applied every cycle to update the queues q_in1 and q_in2 (now of length k). The signal POW_STROBE is applied only in the kth cycle to evaluate power consumption. Note that function trans_count changes to accomodate k-long queues (see FIG. 8).

Figure 1:
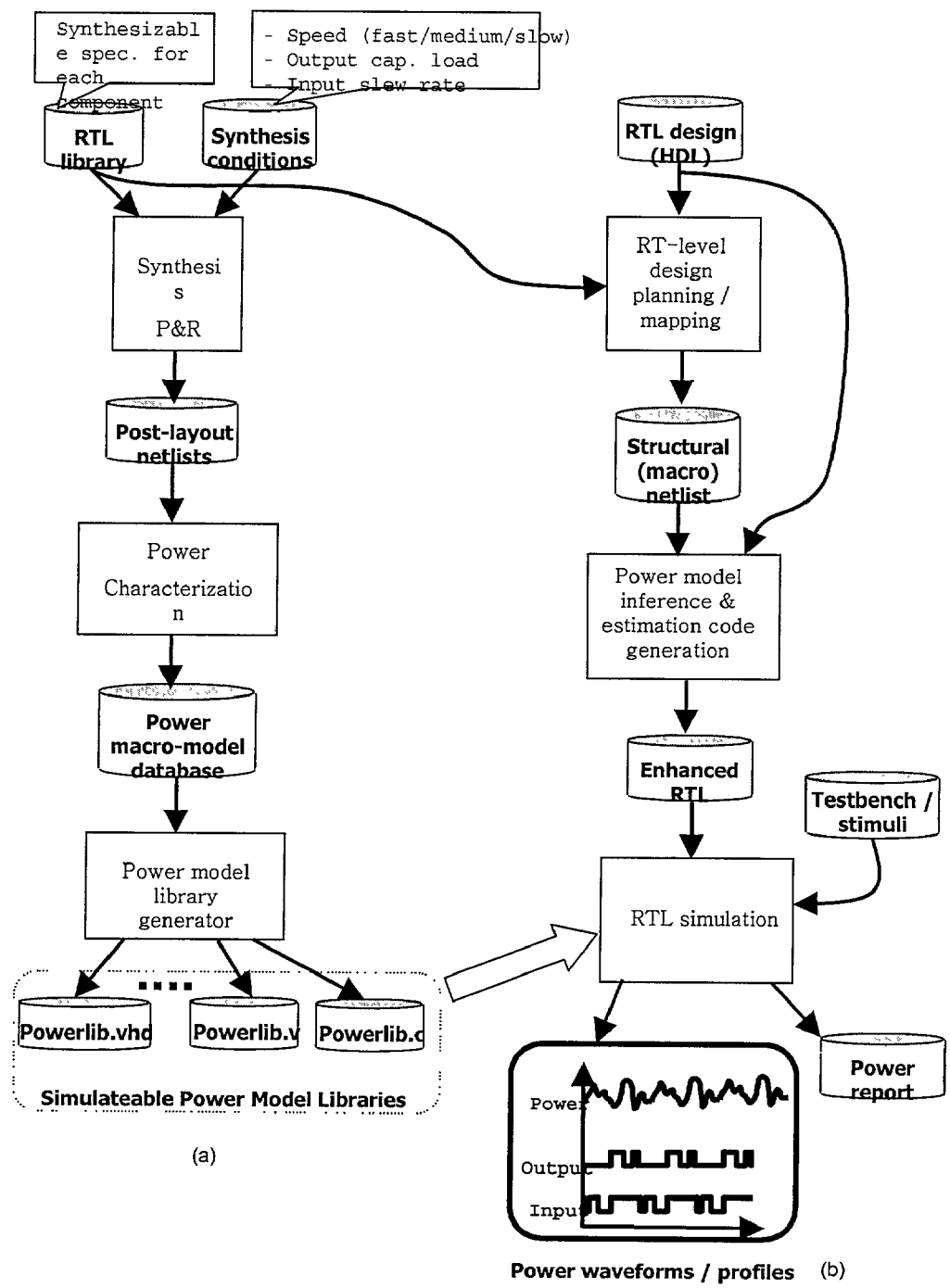
Figure 9:
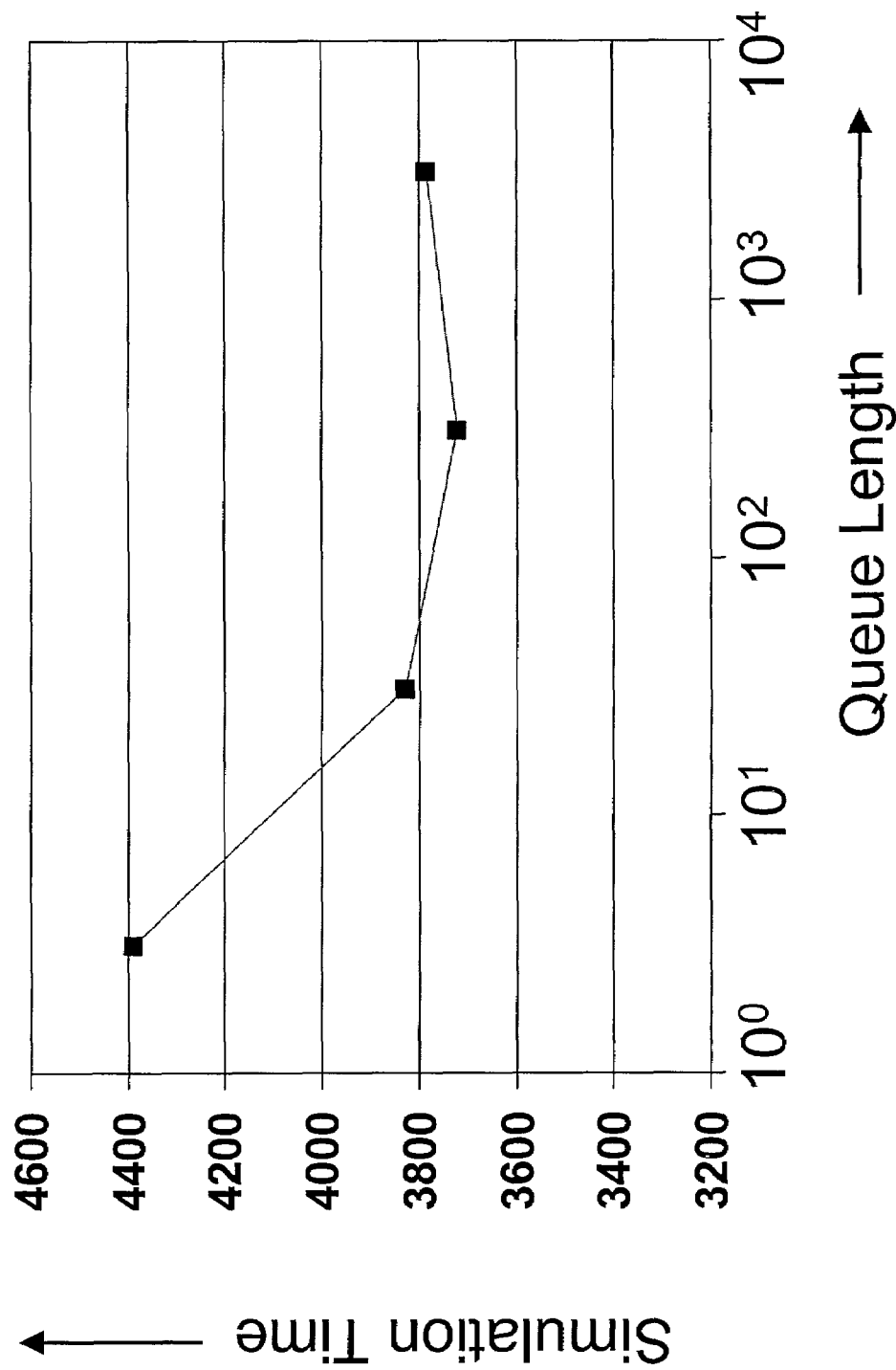
FIG. 9 shows simulation time trade-offs with varying queue lengths.

Note that the amount of additional storage required by the simulator to store component values is directly proportional to the size of the design and k. FIG. 9 shows the variation in simulation times for a design with 100,000 instances of addwc_1bit_power with different queue lengths. The figure shows that at large values of k (k>250), the simulation times begin to rise. This is because the performance gains due to delayed computation get outweighed by the amount of memory needed by the simulator.

c) Partitioned Statistical Sampling

Partitioned statistical sampling works on the hypothesis that power estimation can be made more efficient by varying the frequency with which power samples are obtained for each RTL component. Partitioned sampling is in contrast with conventional sampling techniques used in gate-level or transistor-level power estimation <45>, wherein the entire circuit is considered as a single partition and power estimation computations for all components in the circuit are performed at the same time. Partitioned sampling is motivated by the following general observations.

1. Different regions of a circuit contribute differently to the total power consumption. Therefore, "accurate power measurements" need to be made only on those regions that contribute significantly to power consumption.

2. Different components in a circuit display different degrees of variation in power consumption, i.e., the variance of the power distributions are different. High variance components are challenging to power estimation and, therefore, merit a larger fraction of the computational effort.

3. Power reduction techniques such as clock gating, operand isolation further add to the disparity in the power consumption profiles by reducing switching activity (and, hence power consumption) for selected portions of the circuit.

Figure 10:
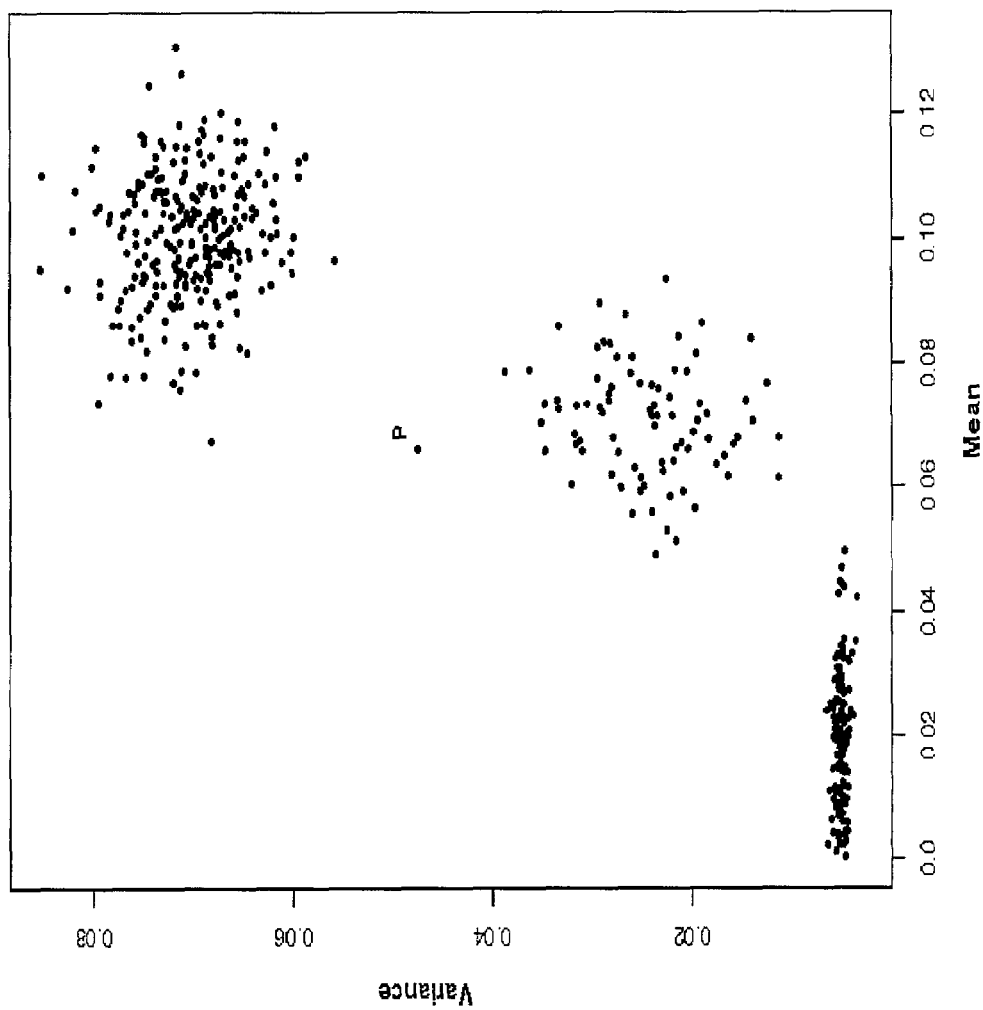
FIG. 10 shows an example Mean Variance Scatter Plot (MVSP).
Figure 11:
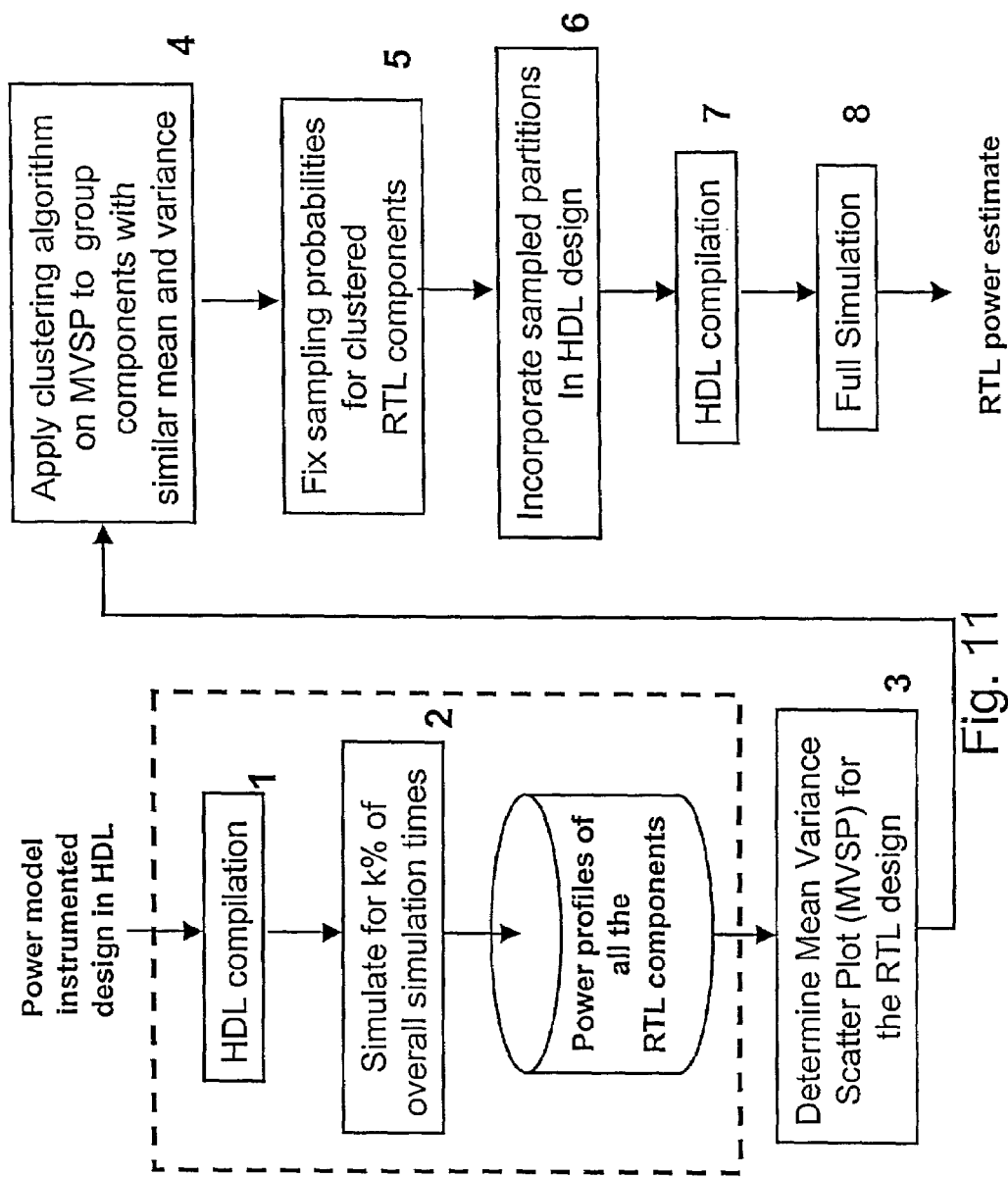
FIG. 11 shows a flowchart for partitioned statistical sampling.

FIG. 11 outlines an exemplary flowchart for partitioned sampling. The input to the flowchart are the power model enhanced design in HDL, its testbench and a control parameter k. The output of the flowchart is the average power consumption of the input RTL design. Steps 1 and 2 involve an initial compilation and simulation run, wherein the power vs. time profiles is determined of all the RTL components with a short simulation run (k % of the total simulation length). Using these power profiles, the mean and variance of the power distributions are computed for all the RTL components. The mean-variance data so obtained can be graphed as a scatter plot to obtain the Mean Variance Scatter Plot (MVSP) for the design. An example MVSP is shown in FIG. 10, where, the X and Y axes correspond to the mean power and variance, respectively. A point (x,y) in the plot corresponds to an RTL component that has a power profile with mean x and variance y. For example, Point P has a mean of 0.066 mW and variance of 0.047 mW2.

Steps 4–6 use the MVSP to partition the RTL design. Step 4 employs a data clustering algorithm <42> to partition the MVSP into groups that have similar mean powers and variance. Here, clustering is used to aggregate components with similar power characteristics so that they can be tracked with equal computational effort during power estimation. Step 5 analyzes the clustering thus obtained to determine the sampling probability for each cluster. Step 6 then incorporates the corresponding changes in the HDL description of the design. Finally, HDL compilation and full simulation (steps 7 and 8) follow to complete RTL power estimation.

The steps 4 and 5 of the above flowchart are discussed further herein.

(1) Partitioning

The technique used in Step 4 of FIG. 11 to partition the MVSP is similar to the hierarchical agglomerative clustering algorithm used in other unrelated fields. The input to the algorithm is an N×2 matrix M, where each row corresponds to an RTL component and the two column entries list the mean and variance, respectively. The working of the algorithm is briefly outlined below.

1. Compute the Euclidean distance or a similar separation metric between every pair of rows in M (each row of M corresponds to a point in the MVSP). This yields the initial cluster separation matrix CSM that lists the separation of clusters for the initial configuration (each cluster has a singleton component).

2. Using the CSM, compute the average distance between every cluster pair. Average distance is calculated from the distance between each point in a cluster and all other points in another cluster. The two clusters with the lowest average distance are then merged into a single cluster. Update CSM to reflect this merge.

3. Repeat Step 2 until all components are in a single cluster.

The output of clustering is a nested grouping of RTL components represented as a dendogram. FIG. 12(a) shows the dendogram corresponding to the MVSP seen in FIG. 10. The dendogram can be broken at different levels to yield different clusterings of the RTL components. FIG. 12(b) shows the MVSP partitioned into 3 distinct clusters.

(2) Determining the Sampling Probabilities

The clusters, as determined in Step 4, group RTL components with similar power characteristics (mean and variance). The next step is to fix the sampling probabilities for the different clusters. Various factors must be considered while fixing the sampling probabilities. Let $C_1, C_2 \ldots C_n$ denote n clusters (each cluster holding one or more RTL components). Then, the formulation for determining the sampling probabilities can be derived as follows.

1. The error due to sampling must be minimized. In other words, if $\delta P_i$ represents the estimated error due to sampling a cluster $C_i$, then the aggregate error for the entire design, which is given by $$\Delta P = \sum_{i=1}^{n} \delta P_i \tag{2}$$

should be minimized.

2. In addition, if cluster $C_i$ accounts for a greater fraction of the total power than cluster $C_j$, then the error in sampling cluster $C_i$ is relatively more significant (during minimization) compared to error in sampling cluster $C_j$. Therefore, the estimated error $\delta P_i$ in Equation 2 is weighted by the fractional power $f_i$ defined as follows. Let $f_i$ denote the cumulative power of all the RTL components in cluster $C_i$ expressed as a fraction of the total power. Then, $$f_i = \frac{\sum_{comp \in Ci} \overline{P}_{comp}}{\sum_{i=1}^{n} \sum_{comp \in Ci} \overline{P}_{comp}} \tag{3}$$

Equation 2 is rewritten to derive the weighted sum of cluster errors, which is the objective function that must be minimized.

$$\Delta P_{weighted} = \sum_{i=1}^{n} fi * \delta Pi \tag{4}$$

$\delta P_i$ in Equation 4 is derived as follows. For normal distributions of power profiles for an RTL component comp in a cluster $C_i$), the error in estimated power $\epsilon$comp due to sampling is governed by the following equation <45>.

$$\epsilon comp \approx t\alpha/2 * Scomp/\sqrt{Ni} \tag{5}$$

In the above equation, Scomp refers to the standard deviation of the power profile of comp, $N_i$ is the sampling rate for the cluster $C_i$, while $t_\alpha/2$ is a constant for a given confidence interval 1-α. Therefore, the aggregate error $\delta P_i$ is given by $$\delta Pi = \sum_{comp \in Ci} \varepsilon_{comp} = const * \left( \sum_{comp \in Ci} scomp / \sqrt{N_i} \right) \tag{6}$$

The constraints that must be obeyed while minimizing Equation 4 can be derived as follows. Let $N_{tot}$ be the total number of power samples that would be taken during a complete power estimation run (no acceleration). Let the computational budget for partitioned statistical sampling in terms of the total number of power samples be a fraction $n_f$ of $N_{tot}$. If $|C_1|, |C_2| \ldots |C_n|$ represent the number of RTL components in clusters $C_1, C_2 \ldots C_n$, then the constraints are simply the following $$|C_1|.N_1+|C_2|.N_2+ \ldots +|C_n|.N_n \leq n_f*N_{tot} \text{ and, } N_i \geq 1,$$
$$\forall i=1 \ldots n \tag{7}$$

Once $N_1 \ldots N_n$ are determined, the sampling probabilities for each cluster $Pr_i$ can simply be written down as follows.

$$Pr_i = \frac{|C_i| * N_i}{nf * N_{tot}} \tag{8}$$

Minimizing the objective function specified in Equation 4 subject to the constraints in Equation 7 is a linearly constrained optimization problem <46>, wherein, the constraints are linear but the objective function is not. There are many solvers for this problem <47, 48> which can be used to find $N_i$ and hence, $Pr_i$. The application of this formulation is now illustrated with an example.

EXAMPLE 3

FIG. 13 lists the aggregate mean power ($\Sigma_{comp \in ci} \overline{P}_{comp}$), aggregate standard deviation ($\Sigma_{comp \in ci} S_{comp}$) and the number of RTL components ($|C_i|$) for the clusters $C_1$, $C_2$ and $C_3$ shown in FIG. 12(b).

From this data, the objective function that is to be minimized is formulated (see Equations 4 and 6)

$$\Delta P = \text{constant} * (0.59/\sqrt{N1}) + 51.5/\sqrt{N2}) + 2.24/\sqrt{(N3)}) \quad (9)$$

If $N_{tot}$ is 300,000 and $n_f$ is 10%, the allowed budget of samples is 30,000. Then, it follows from Equation 7 that the constraints for minimizing Equation 9 are $$120.N_1 + 256.N_2 + 85.N_3 <= 30000 \text{ and, } N_i >= 1 \forall i = 1 \quad (10)$$

Minimizing Equation 9 subject to the constraints in Equation 10 yields $N_1=9$, $N_2=104$ and $N_3=27$. Therefore, the desired sampling probabilities $Pr_1$, $Pr_2$ and $Pr_3$ are 0.04, 0.89 and 0.11, respectively.

IV.C Systems for Power Estimation

The above discussed techniques are used to build systems for estimating power in electronic circuits described at the register-transfer level (RTL). A power estimation system for power estimation for a circuit is shown in FIG. 15. A power model enhanced RTL description of the circuit 15.1 is provided. An RTL description modifier 15.3 is adapted to modify the power model enhanced RTL description to make it more friendly to the simulator 15.2.

FIG. 16 shows another power estimation system. A power enhanced RTL description of the circuit 16.1 is provided. A partitioner 16.4 capable of partitioning the RTL description is partitioned into clusters according to their power consumption profile. A sample generator 16.3 capable of deriving a customized sampling for each of said clusters, wherein the simulator 16.2 is capable of performing simulations using the customized samples.

FIG. 17 shows yet another power estimation system for estimating power consumption of the circuit. A power enhanced RTL description 17.1 of the circuit is provided. A memory estimator 17.3 capable of studying tradeoff issues between computation and memory usage for simulating the power model enhanced RTL description on the simulator 17.2 is provided. The system is capable of reducing the required computation for simulating the power model enhanced RTL circuit description on the simulator by increasing memory usage prior to running the simulator to estimate the power consumed by the circuit.

IV.D. Experimental Results

In this section, the results of applying the proposed techniques to an industrial RTL power estimation flow is presented.

The experimental framework used for evaluation of the RTL power estimation described above is as follows. First, the C behavioral descriptions of the benchmark circuits were fed to the behavioral synthesis tool CYBER <39> to synthesize RTL implementations. Enhancements were made to the CYBER back-end to perform the power model inference and power estimation code generation process described in the background material. The output of CYBER is an enhanced HDL description of the circuit that contains the power models of the components appropriately instantiated, and the other code necessary for RTL power estimation. In the experiments, VHDL was used as the hardware description language in most cases. However, some of the designs used mixed Verilog-VHDL descriptions. The techniques in this disclosure care applicable with any hardware description language and simulator. The RTL power model library used in our experiments corresponds to NEC's CB-C9 VX (0.35 micron 3.3V CMOS) technology <49>. HDL compilation and simulation of the enhanced RTL descriptions was performed using ModelSim <50> and designer supplied testbenches, to obtain the final power estimates. The disclosed acceleration techniques were implemented so as to post-process the output of CYBER and prepare an efficient RTL implementation for power estimation. The clustering and linearly constrained optimization steps in partitioned statistical sampling were performed using the well-known tools S-PLUS <40> and EXCEL <48>, respectively.

Table 1 describes the characteristics of the benchmarks used in the experiments. Column 1 lists all the benchmarks used in our experiments. Circuits CKT1 to CKT6 are all NEC internal designs used in different image, video, and security processing applications. Column 2 lists the number of RTL components instantiated in the HDL description of each circuit, which are further broken into a control logic gate count (Column 3), a functional unit count (Column 4), a multiplexer count (Column 5) and a register count (Column 6). Finally, Column 7 reports the transistor count in these designs. It can be seen that power estimation must be performed on designs with over 1.25 million transistors (circuit CKT6). This demonstrates a clear need for performing power estimation at the higher levels of the design hierarchy such as RTL, which have a lower number of components (26048 for circuit CKT6).

TABLE 1

Circuit statistics

| Circuit | #Comp | #Gates | #Fus | #Muxes | #Regs | #Transistors |
|---------|-------|--------|------|--------|-------|--------------|
| CKT1 | 1805 | 1728 | 0 | 61 | 16 | 20901 |
| CKT2 | 1808 | 1626 | 10 | 112 | 60 | 31496 |
| CKT3 | 6654 | 6371 | 8 | 220 | 55 | 28541 |
| CKT4 | 856 | 721 | 9 | 89 | 37 | 14943 |
| CKT5 | 1838 | 1458 | 16 | 238 | 126 | 48089 |
| CKT6 | 26048 | 23191 | 93 | 1944 | 820 | 1254006 |

Table 2 reports the performance and accuracy of the proposed techniques. For each circuit, we determine the average power estimates and the CPU time taken by RTL power estimation without and with our speed-up techniques. Columns 2–4 report, respectively, the CPU time taken by functional simulation (minor column Func. Sim.), original RTL power estimation (minor column Orig.) and the accelerated power estimation flow (minor column Acc.). All CPU times were measured on a SUN Fire 280R server with two 900-MHz UltraSparc processors and 4 GB RAM. Column 5 reports the percentage speedup obtained by using the accelerated power estimation flow with respect to the original case. The results show that the proposed acceleration techniques reduce power estimation times significantly (as much as 31x). FIG. 14 plots the performance overheads with respect to functional simulation for power estimation without (columns referenced by Orig.) and with our acceleration techniques (columns referenced by Acc.). It can be seen that the proposed techniques bring power estimation times closer to functional simulation times. For the circuit CKT6, the CPU time spent on power estimation was originally 42.9 times more than that spent on functional simulation. After applying the acceleration techniques, power estimation time was brought down to just 1.4 times the CPU time taken for functional simulation. For any simulation-based RTL power estimation technique, the functional simulation time is a lower bound on the CPU time required for RTL power estimation.

TABLE 2

Performance and accuracy results for accelerated RTL power estimation

| Circuit | Func. Sim. (sec) | CPU Time Orig. (sec) | Acc. (sec) | Reduction | Estmated Power Orig. (mW) | Acc. (mW) | Error |
|---|---|---|---|---|---|---|---|
| CKT1 | 207.5 | 4149.5 | 304.5 | 13.6X | 2.6420 | 2.6798 | 1.43% |
| CKT2 | 621.8 | 3644.5 | 818.0 | 4.5X | 3.7795 | 3.8257 | 1.22% |
| CKT3 | 760.4 | 30086.9 | 1120.7 | 26.4X | 2.9733 | 2.9581 | −0.51% |
| CKT4 | 116.9 | 3760.8 | 200.1 | 18.9X | 1.8422 | 1.8474 | 0.28% |
| CKT5 | 233.9 | 8775.4 | 410.3 | 20.8X | 4.4297 | 4.4290 | −0.02% |
| CKT6 | 2924.5 | 125362.3 | 4002.6 | 30.6X | 36.5647 | 36.4587 | −0.29% |

Columns 6 and 7 tabulate the average power estimates reported by the original and the accelerated framework. Column 8 tracks the relative error in the power estimates. The error is extremely low and varies from 0.02% (for circuit CKT5) to 1.43% (for circuit CKT1). Note that the accuracy of macro-modeling based RTL power estimation is very high, when compared to gate-level power estimation. For example, the RTL power estimate for CKT3 differs by only 6.44% from the corresponding gate-level power estimate. Gate-level power estimation was performed by the NEC OpenCAD tool suite <51> on a gate-level netlist obtained after technology mapping (with the NEC CB-C9 VX cell library <49>) and synthesis using Design Compiler <52>.

IV.E. Conclusions

In this disclosure, a suite of techniques is used to accelerate RTL power estimation. These speedup techniques render the efficiency of RTL power estimation to be close to functional simulation, making it viable for large designs. The speedup techniques include HDL-semantic-aware optimizations, storage vs. CPU time tradeoffs, and a novel technique called partitioned sampling. Experiments with several designs of up to 1.25 million transistors indicate that performance improvements of up to 31× are achieved by the disclosed techniques with minimum loss of accuracy.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for accelerating power estimation for a circuit comprising:
   generating an RTL description of the circuit;
   generating a power model enhanced RTL description of the circuit;
   selecting a simulator;
   modifying the power model enhanced RTL description to run more efficiently on the simulator; and
   running the simulator to estimate the power consumed by the circuit,
   wherein the RTL description of the circuit is enhanced by instantiating simulatable macro-models for at least one basic component in a design of the circuit.

2. The method of claim 1, wherein the power model enhanced RTL description is modified by optimizing HDL semantics such that simulation performance is improved.

3. The method of claim 2, wherein the said optimizing is done by converting a data type of at least one operand involved in power model computations from a first data type to a second data type, wherein the second data type is simpler than the first data type.

4. The method of claim 2, wherein the said optimizing is done by expanding at least one HDL function so that the overheads of entering and exiting the function are removed.

5. The method of claim 2, wherein the said optimizing is done by shutting down an HDL description of at least one power model and activating said HDL description of the power model only when necessary.

6. The method of claim 2, wherein the said optimizing is done by reducing the workload of at least one power model.

7. The method of claim 6, wherein one-shot computations in the HDL code of the power model are moved to the exterior of power model, so that redundant evaluations are removed.

8. The method of claim 6, wherein computations inside a loop within the HDL code of the power model are moved to the exterior of the loop.

9. A method for accelerating power estimation for a circuit comprising:
   generating an RTL description of the circuit;
   generating a power model enhanced RTL description of the circuit;
   selecting a simulator;
   studying tradeoff issues between computation and memory usage for simulating the power model enhanced RTL description on the selected simulator;
   reducing the required computation for simulating the power model enhanced RTL circuit description on the simulator by increasing memory usage; and
   running the simulator to estimate the power consumed by the circuit,
   wherein the RTL description of the circuit is enhanced by instantiating simulatable macro-models for at least one basic component in a design of the circuit.

10. The method of claim 9, wherein input and output values of RTL components are queued in each cycle and a compute operation for power consumption is performed only once in every k cycles, where k is a positive integer greater than 1.

11. A method for accelerating power estimation for a circuit comprising:
    generating an RTL description of the circuit;
    generating a power model enhanced RTL description;
    selecting a simulator;
    performing partitioning, wherein the RTL description is partitioned into clusters according to their power consumption profile;

deriving a customized sampling for each of said clusters; and simulating the RTL description on the simulator based on the samplings wherein the RTL description of the circuit is enhanced by instantiating simulatable macro-models for each at least one basic component in a design of the circuit.

12. The method of claim 11 wherein the partitioned sampling is performed by a process comprising:
 i) computing a mean and a variance of power distribution for all RTL components in the power model enhanced RTL description,
 ii) generating a mean-variance scatter plot;
 iii) partitioning the RTL description based on the scatter plot to generate clusters of components with similar power characteristics;
 iv) determining the sampling probability of each of the said clusters;
 v) incorporating the clusters into the power model enhanced RTL description.

13. The method of claim 12 wherein computing the mean and variance of power distribution is performed by:
 i) performing a short simulation run of the power model enhanced RTL description, wherein a short simulation is shorter than an overall simulation run;
 ii) generating a power profile based on the short simulation run;
 iii) computing the mean and variance of power from the power profile.

14. The method of claim 12, wherein partitioning is performed by a process comprising
 A) computing a distance metric for measuring the similarities in the power profiles for every possible pair of RTL components; wherein the distance is computed based on data that comprises the mean and variance of the power profiles for the corresponding RTL components;
 B) generating an initial set of clusters and forming a cluster separation matrix (CSM) based on the computations in A;
 C) computing average distance between every cluster pair in the CSM, wherein average distance between a cluster pair is calculated based on a distance between each component of a cluster and all components in another cluster;
 D) merging two clusters with a lowest average distance and updating the CSM to reflect the merging;
 E) repeating C–D until all components are in one cluster while recording the cluster merging sequence; and
 F) using the cluster merging sequence to generate the final set of clusters.

15. The method of claim 14, wherein, during error computation, a first cluster that accounts for a greater fraction of power consumed is weighted more than a second cluster that accounts for a lesser fraction of the power consumed.

16. The method of claim 12, wherein the said sampling probability is determined by minimizing the potential error due to the sampling.

17. A power estimation system for power estimation for a circuit comprising:
 a power model enhanced RTL description of the circuit;
 a simulator; and
 an RTL description modifier adapted to modify the power model enhanced RTL description to run more efficiently on the simulator
 wherein the enhanced RTL description of the circuit comprises instantiated simulatable macro-models for each at least one basic component in a design of the circuit.

18. The system of claim 17, wherein RTL description modifier is capable of modifying the power model enhanced RTL description by optimizing HDL semantics such that simulation performance is improved.

19. The system of claim 18, wherein the RTL description modifier is capable of optimizing by converting a data type of at least one operand involved in power model computations from a first data type to a second data type, wherein the second data type is simpler than the first data type.

20. The system of claim 18, wherein the RTL description modifier is capable of optimizing by expanding at least one HDL function so that the overheads of entering and exiting the function are removed.

21. The system of claim 18, wherein the RTL description modifier is capable of optimizing by shutting down an HDL description of at least one power model and activating said HDL description of the power model only when necessary.

22. The system of claim 18, wherein the RTL description modifier is capable of optimizing by reducing the workload of at least one power model.

23. The system of claim 18, wherein one-shot computations in the HDL code of at least one power model are moved to the exterior of the power model, so that redundant evaluations are removed.

24. The system of claim 23, wherein computations inside a loop within the HDL code of at least one power model are moved to the exterior of the loop.

25. A power estimation system for estimating power consumption of the circuit comprising:
 a power enhanced RTL description of the circuit;
 a simulator;
 a partitioner capable of partitioning the RTL description is partitioned into clusters according to their power consumption profile;
 a sample generator capable of deriving a customized sampling for each of said clusters, wherein the simulator is capable of performing simulations using the customized samples
 wherein the enhanced RTL description of the circuit comprises instantiated simulatable macro-models for each at least one basic component in a design of the circuit.

26. A power estimation system for estimating power consumption of the circuit comprising:
 a power enhanced RTL description of the circuit;
 a simulator;
 a memory estimator capable of studying tradeoff issues between computation and memory usage for simulating the power model enhanced RTL description on the simulator;
 wherein the system is capable of reducing the required computation for simulating the power model enhanced RTL circuit description on the simulator by increasing memory usage prior to unning the simulator to estimate the power consumed by the circuit
 wherein the enhanced RTL description of the circuit comprises instantiated simulatable macro-models for each at least one basic component in a design of the circuit.

27. The system of claim 26, wherein the system is capable of queueing the input and output values of RTL components in each cycle and further capable of performing a compute operation for power consumption only once in every k cycles, where k is a positive integer greater than 1.

* * * * *